US009053574B2

(12) United States Patent
Ernvik et al.

(10) Patent No.: US 9,053,574 B2
(45) Date of Patent: Jun. 9, 2015

(54) CALIBRATED NATURAL SIZE VIEWS FOR VISUALIZATIONS OF VOLUMETRIC DATA SETS

(75) Inventors: Aron Ernvik, Linköping (SE); Magnus Ranlöf, Norrköping (SE); Hong Lo, Linköping (SE); Joackim Pennerup, Linköping (SE); Igor Milososki, Linköping (SE); Erik Edespong, Norrköping (SE)

(73) Assignee: Sectra AB, Linkoping (SE)

( * ) Notice: Subject to any disclaimer, the term of this patent is extended or adjusted under 35 U.S.C. 154(b) by 539 days.

(21) Appl. No.: 13/218,877

(22) Filed: Aug. 26, 2011

(65) Prior Publication Data
US 2012/0223945 A1 Sep. 6, 2012

Related U.S. Application Data

(60) Provisional application No. 61/448,307, filed on Mar. 2, 2011.

(51) Int. Cl.
*G06T 15/00* (2011.01)
*G06T 15/20* (2011.01)
*G06T 15/08* (2011.01)

(52) U.S. Cl.
CPC .......... *G06T 15/20* (2013.01); *G06T 15/08* (2013.01); *G06T 2210/41* (2013.01)

(58) Field of Classification Search
CPC ...... G06T 2210/41; G06T 15/20; G06T 15/08
See application file for complete search history.

(56) References Cited

U.S. PATENT DOCUMENTS

| | | | | |
|---|---|---|---|---|
| 2001/0055016 | A1* | 12/2001 | Krishnan | 345/424 |
| 2007/0016047 | A1* | 1/2007 | Tsunoda et al. | 600/443 |
| 2007/0024594 | A1* | 2/2007 | Sakata et al. | 345/173 |
| 2007/0153028 | A1* | 7/2007 | Nah et al. | 345/698 |
| 2007/0255137 | A1* | 11/2007 | Sui et al. | 600/443 |
| 2007/0255139 | A1* | 11/2007 | Deschinger et al. | 600/443 |
| 2008/0051652 | A1* | 2/2008 | Ichioka et al. | 600/437 |
| 2008/0055310 | A1* | 3/2008 | Mitchell et al. | 345/424 |
| 2008/0232658 | A1* | 9/2008 | Sugaya et al. | 382/128 |
| 2009/0259967 | A1* | 10/2009 | Davidson et al. | 715/799 |
| 2010/0031202 | A1* | 2/2010 | Morris et al. | 715/863 |
| 2011/0148796 | A1* | 6/2011 | Hollemans et al. | 345/173 |
| 2012/0131488 | A1* | 5/2012 | Karlsson et al. | 715/771 |

OTHER PUBLICATIONS

Yu et al., Direct-Touch interaction for the Exploration of 3D scientific Visualization Spaces, IEEE Transactions on Visualization and Computer Graphics, vol. 16, No. 6, Nov./Dec. 2010, Provided in IDS.*
Jung et al., Adapting X3D for Multi-touch Environments, Web3D 2008, Los Angeles, California, Aug. 2008.*

(Continued)

*Primary Examiner* — James A Thompson
*Assistant Examiner* — Tapas Mazumder
(74) *Attorney, Agent, or Firm* — Myers Bigel Sibley & Sajovec, P.A.

(57) ABSTRACT

Systems, methods, computer programs, and circuits that can provide 3-D perspective natural size views calibrated to ROIs.

37 Claims, 10 Drawing Sheets

(56) References Cited

OTHER PUBLICATIONS

Andriole et al., *Optimizing Analysis, Visualization, and Navigation of Large Image Data Sets: One 5000-Section CT Scan Can Ruin Your Whole Day*, Radiology, May 2011, pp. 346-362, vol. 259: No. 2.
Bade et al., *Usability Comparison of Mouse-based Interaction Techniques for Predictable 3d Rotation*, Lecture Notes in Computer Science, 2005, 13 pages, vol. 3638/2005, 924.
Bowman et al., *3D User Interfaces: New Directions and Perspectives*, IEEE Computer Society, Nov./Dec. 2008, pp. 20-36, vol. 28 No. 6.
Burton et al., *Clinical, educational, and epidemiological value of autopsy*, Lancet, 2007, pp. 1471-1480, vol. 369.
Buxton, William, Chunking and Phrasing and the Design of Human-Computer Dialogues, Proceedings of the IFIP World Computer Congress, 1986, pp. 475-480 (printed on 9 pages).
Carpendale, Sheelagh, *Evaluating Information Visualizations*, Lecture Notes in Computer Science, 2008, pp. 19-45, vol. 4950/2008.
Coffey et al., Slice WIM: *A Multi-Surface, Multi-Touch Interface for Overview+Detail Exploration of Volume Datasets in Virtual Reality*, I3D Symposium on Interactive 3D Graphics and Games, Feb. 18-20, 2011, pp. 191-198.
Edelmann et al., *The DABR—A Multitouch System for Intuitive System for 3D Scene Navigation*, 3DTV Conference: The True Vision—Capture, Transmission and Display of 3D Video, 2009, pp. 1-4.
Frohlich et al., *On 3D Input Devices*, IEEE Computer Graphics and Applications, Projects in VR, © 2006, pp. 15-19, vol. 26 Issue 2.
Gallo et al., *A user interface for VR-ready 3D medical imaging by off-the-shelf input devices*, Computers in Biology and Medicine, 2010, pp. 350-358, vol. 40.
Hancock et al., *Rotation and Translation Mechanisms for Tabletop Interaction*, Proceedings of the First IEEE International Workshop on Horizontal Interactive Human-Computer Systems (TABLETOP '06), 2006, pp. 79-88.
Hancock et al., *Shallow-Depth 3D Interaction: Design and Evaluation of One-, Two- and Three-Touch Techniques*, CHI 2007 Proceedings of the SIGCHI conference on Human factors in computing systems, 2007, pp. 1147-1156.
Hancock et al., *Sticky Tools: Full 6DOF Force-Based Interaction for Multi-Touch Tables*, ITS '09 Proceedings of the ACM International Conference on Interactive Tabletops and Surfaces, © 2009, pp. 133-140.
Hornecker et al., *Collaboration and Interference: Awareness with Mice of Touch Input*, CSCW '08 Proceedings of the 2008 ACM conference on Computer supported cooperative work, © 2008, pp. 167-176.
Hu et al., *The feasibility of three-dimensional displays of the thorax for preoperative planning in the surgical treatment of lung cancer*, European Journal of Cardio-thoracic Surgery, 2007, pp. 506-511, vol. 31.
Isenberg et al., *Interactive Exploratory visualization of 2D Vector Fields*, Computer Graphics Forum, May 2008, pp. 983-990. vol. 27 No. 3.
Isenberg et al., *An Exploratory Study of Co-located Collaborative Visual Analytics Around a Tabletop Display*, IEEE Symposium on Visual Analytics Science and Technology (VAST), 2010, pp. 179-186.
Jung et al., *Adapting X3D for Multi-touch Environments*, Web3D '08 Proceedings of the 13$^{th}$ international symposium on 3D web technology, 2008, pp. 27-30 and 122.
Kin et al., *Determining the Benefits of Direct-Touch, Bimanual, and Multifinger Input on a Multitouch Workstation*, Proceedings of Graphics Interface 2009, pp. 119-124.
Krueger et al., *Fluid Orientation on a Tabletop Display; Integrating Rotation and Translation*, University of Calgary Computer Science, http://hdl.handle.net/1880/45767, Apr. 5, 2004, 10 pages.
Krueger et al., *The Responsive Workbench*, IEEE Computer Graphics and Applications, May 1994, pp. 12-15, vol. 14 Issue 3.
Lee et al., *Preoperative Simulation of Vascular Anatomy by Three-Dimensional Computed Tomography Imaging in Laparoscopic Gastric Cancer Surgery*, Journal of the American College of Surgeons, Dec. 2003, pp. 927-936, vol. 197, Issue 6.
Lin et al., *Interaction with Medical Volume Data on a Projection Workbench*, Int Conf Artif Real Telexistence, 2000, pp. 148-152, vol. 10.
Liu et al., TNT: *Improved Rotation and Translation on Digital Tables*, GI '06 Proceedings of Graphics Interface, 2006, pp. 25-32.
Ljung et al., *Full Body Virtual Autopsies using a State-of-the-art Volume Rendering Pipeline*, IEEE Transactions on Visualization and Computer Graphics, 2006, pp. 869-876, vol. 12, No. 5.
Lundstrom et al., Multi-Touch Table System for Medical Visualization: Application to Orthopedic Surgery Planning, IEEE Transactions on Visualization and Computer Graphics, Dec. 2011, pp. 1775-1784, vol. 17, No. 12.
Martinet et al., *3D Positioning Techniques for Multi-touch Displays*, VRST '09 Proceedings of the 16$^{th}$ ACM Symposium on Virtual Reality Software and Technology, 2009, pp. 227-228.
Martinet et al., *The Effect of DOF Separation in 3D Manipulation Tasks with Multi-touch Displays*, VRST '10 Proceedings of the 17$^{th}$ ACM Symposium on Virtual Reality Software and Technology, 2010, pp. 111-118.
McLachlan et al., *Teaching anatomy without cadavers*, Medical Education, 2004, vol. 38, Issue 4, pp. 418-424.
North et al., *Understanding Multi-touch Manipulation for Surface Computing*, Lecture Notes in Computer Science, 2009, vol. 5727/2009, pp. 236-249.
Porter, David H., *Perspective Volume Rendering*, University of Minnesota Supercomputer Institute Research Report UMSI 91/149, May 1991, 34 pages.
Reisman et al., *A Screen-Space Formulation for 2D and 3D Direct Manipulation*, UIST '09 Proceedings of the 22$^{nd}$ annual ACM symposium on user interface software and technology, 2009, pp. 69-78.
Rogers et al., *Finger Talk: Collaborative Decision-Making Using Talk and Fingertip Interaction Around a Tabletop Display*, CHI EA '04 extended abstracts on Human factors in computing systems, 2004, pp. 1271-1274.
Roulson et al., *Discrepancies between clinical and autopsy diagnosis and the value of post mortem histology; a meta-analysis and review*, Histopathology, Dec. 2005, vol. 47, Issue 6, pp. 551-559.
Scharsach, Henning, *Advanced GPU Raycasting*, Proceedings of CESCG, 2005, 8 pages.
Shiozawa, et al., Preoperative virtual simulation of adrenal tumors, Abdominal Imaging, 2009, pp. 113-120, vol. 34. No. 1.
Sielhorst et al., *Advanced Medical Displays: A Literature Review of Augmented Reality*, Journal of Display Technology, Dec. 2008, pp. 451-467, vol. 4, No. 4.
Silen et al., *Advanced 3D visualization in student-centred medical education*, Medical Teacher, 2008, pp. e115-e124, vol. 30, No. 5.
Thayyil et al., *Post-mortem MR and CT imaging in fetuses, newborns and children: an evidenced based approach*, Diagnostic Histopathology, Mini-Symposium: Non-Invasive Radiological Autopsy, Dec. 2010, pp. 565-572, vol. 16, Issue 12.
VAT (Virtual Autopsy Table), Two screenshots of video, http://www.youtube.com/watch?v=bws6vWM1v6g, (video 2:16 minutes long) posted on YouTube Oct. 8, 2009, 2 pages, printed from the internet on Sep. 15, 2011.
VAT (Virtual Autopsy Table), photograph, table shown in U.S. on or about Mar. 25, 2010, 1 page.
Volonte et al., *A lung segmentectomy performed with 3D reconstruction images available on the operating table with an iPad*, Interactive Cardiovascular and Thoracic Surgery, 2011, pp. 1066-1068, vol. 12.
Yen et al., *Post-mortem forensic neuroimaging: Correlation of MSCT and MRI findings with autopsy results*, Forensic Science International, Nov. 2007, pp. 21-35, vol. 173, Issue 1.
Yu et al., *FI3D: Direct-Touch Interaction for the Exploration of 3D Scientific Visualization Spaces*, IEEE Transactions on Visualization and Computer Graphics, Nov./Dec. 2010, pp. 1613-1622, vol. 16, No. 6.

\* cited by examiner

CALIBRATED NATURAL SIZE VIEWS FOR VISUALIZATIONS OF VOLUMETRIC DATA SETS

RELATED APPLICATIONS

This application claims the benefit of and priority to U.S. Provisional Application Ser. No. 61/448,307 filed Mar. 2, 2011, the contents of which are hereby incorporated by reference as if recited in full herein.

FIELD OF THE INVENTION

The invention relates to visualization of volumetric data sets using a perspective 3D model and may be particularly suitable for medical images such as, for example, Direct Volume Rendering ("DVR") images.

BACKGROUND

Visualizations of volumetric data sets can be generated using different 3-D projection models, such as, for example, an orthographic projection or a perspective projection. In a perspective model, the on-screen size of the volumetric data depends on the depth position, i.e., the farther the data is into the depth of the virtual projection model used for rendering, the smaller it is depicted. See, Perspective Volume Rendering, D H Porter, 1991, University of Minnesota Supercomputer Institute Research Report UMSI 91/149. A projection, preserving size along the depth dimension, is known as an orthographic projection. FIGS. 1A and 1B illustrate examples of projections of volumetric data consisting of two equal-size objects onto a screen. FIG. 1A is an orthographic projection. FIG. 1B is a perspective projection, where the far-away object is rendered smaller. The perspective model is typically considered advantageous for human interpretation of a visualization as the human visual system is accustomed to connecting perspective to depth cues.

There are many possible ways to depict volumetric data. One of the important benefits of using 3-D visualizations compared to, for instance, 2-D slices is the level of realism achieved. A 3-D depiction of medical data resembles looking at the patient in reality and can therefore be an easily understandable visualization.

SUMMARY OF EMBODIMENTS OF THE PRESENT INVENTION

Embodiments of the invention recognize that an aspect of the desired realism is to present the data in the natural size. Embodiments of the invention are configured to provide natural (actual) size perspective 3-D visualizations to promote human comprehension of visualizations.

Embodiments of the invention are directed to visualization systems. The systems include a display and a circuit in communication with the display. The circuit is configured to: (1) show an image generated as a perspective 3-D rendering of voxels of an image data set on the display; (2) allow a user to select a target region of interest (ROI) associated with the image on the display; and (3) present the perspective 3-D natural size view calibrated with respect to the selected target ROI on the display.

The circuit can be configured to define a reference plane parallel to a viewing plane associated with the screen plane/ROI on the display and, where used, the reference plane can be used to calibrate a size of the object in the natural size view.

The circuit may be configured to derive at least one reference point in a perspective 3-D projection of the ROI based on identification of locations of objects in a mapping volume to generate the calibrated natural size view. The at least one reference point may, in some embodiments, be defined by an object in the mapping volume closest to the screen plane.

The display can be a touch screen display. The circuit can be configured to provide graphic user interface controls with defined touch gesture. A defined substantially rectangular shape touch gesture associated with a concurrent two-hand touch shape on the display both (i) commands the circuit to generate the perspective 3-D natural size view calibrated to the selected target ROI and (ii) defines a boundary for the selected target ROI.

The display can be a touch screen display. The circuit can be configured to provide graphic user interface controls that command the circuit to generate the calibrated natural size view with defined touch gestures. The defined touch gesture on the display about the target ROI can activate the calibrated natural size view.

In some embodiments, when an ROI selected for the calibrated natural size view on the display, a visual border is shown on the display about the ROI.

The circuit can be configured to analyze meta-data associated with the voxels of the image data set to define a voxel size. The circuit can be configured to calculate the calibrated natural size view based on voxel size and a known display area size associated with the display.

The circuit can be configured to define a reference point in a normal view of the selected target ROI and generate the calibrated natural size view so that it maintains the reference point in the same location on the image on the display.

The circuit can be configured to generate a series of reference planes using a common ROI across multiple time points of related 3-D data sets to generate multiple time points of perspective 3-D calibrated natural size views.

The 3-D image data set can be a medical image data set. The display may be provided on a workstation table. The 3-D image data set may comprise a direct volume imaging data set.

Yet other embodiments are directed to visualization systems that include: (a) a touch screen; (b) a graphic user interface (GUI) circuit in communication with the screen, the GUI circuit configured with GUI touch gesture controls; and (c) a visualization circuit in communication with the screen. The visualization circuit is configured to allow a user to select a target region of interest (ROI) on a perspective 3-D image rendered from voxels of an image data set shown on the screen using a defined, two-hand, multi-finger touch gesture, and wherein the visualization circuit is configured to then generate a natural size view calibrated to the target ROI based on: (i) an in situ generated 3-D perspective projection mapping volume used to electronically define a reference plane in a depth dimension; (ii) meta-data defining voxel size of associated with the image data set; and (iii) a display area size associated with the screen.

Still other embodiments are directed to methods of interacting with image data. The methods include: (a) providing an interactive screen with a GUI (graphic user interface); (b) providing a perspective 3-D image rendered from voxels of an image data set; (c) allowing a user to select a region of interest (ROI) of the image shown on the screen; and (d) electronically displaying a perspective 3-D natural size view calibrated to the ROI on the screen in response to the step of allowing a user to select the ROI.

The screen can be a touch screen and the selectively activating step can be carried out by accepting a defined touch gesture. The defined touch gesture can be a concurrent two-hand, multiple finger touch gesture forming a substantially rectangular shape about the ROI on the screen, whereby the touch gesture activates the natural size view of the ROI and defines the size and location of the ROI for the natural size view.

The method may optionally include automatically displaying a line on the screen image about the ROI.

The method may optionally include electronically calculating a calibrated natural size of an object in the ROI based on: (a) a defined size of a display area of the screen; (b) voxel size associated with source image(s) of the data set; and (c) a calculated depth position of the object in the ROI using an in situ defined depth-reference plane.

The displaying step can be carried out so that a reference point in a normal view on the screen used to select the ROI of the natural size view is at the same location in the natural size view on the screen.

Other embodiments are directed to computer program products for visualization systems of image data sets. The computer program product includes a non-transitory computer readable storage medium having computer readable program code embodied in the medium. The computer-readable program code includes: (a) computer readable program code configured to allow a user to select a target region of interest (ROI) associated with a visualized 3-D perspective image of a volumetric image data set on a display; and (b) computer readable program code configured to generate a perspective 3-D natural size view calibrated to the selected target ROI on the display in response to a user's selection.

The computer program code that generates the 3-D perspective natural size calibrated view can calculate size based on: (a) on a defined size of a display area of the screen; (b) voxel size associated with source image(s) of the data set; and (c) a calculated depth position of the object in the ROI using an in situ defined depth-reference plane.

The computer readable program code that is configured to allow a user to selectively activate the calibrated natural size view of the target ROI can be configured to recognize a defined touch gesture having a concurrent two hand, multiple finger touch gesture forming a substantially rectangular shape about the ROI on the screen, whereby the touch gesture activates the natural size view of the ROI and defines the size and location of the ROI for the natural size view.

The computer program product can also include computer readable program code that identifies a reference point in a normal view of the ROI on the screen and displays the calibrated natural size view so that the reference point is at the same location in the natural size view on the screen.

Still other embodiments are directed to visualization circuits for generating visualizations of image data sets. The visualization circuit is configured to accept user input to select a target region of interest (ROI) for a natural size view in a 3-D perspective image rendered from a volumetric image data set shown on a screen using a defined, two-hand, multi-finger touch gesture. The visualization circuit is also configured to generate the natural size view calibrated to the selected ROI based on: (i) an in situ generated 3-D perspective projection mapping volume used to electronically define a reference plane in a depth dimension; (ii) meta-data defining voxel size of associated with the image data set; and (iii) a display area size associated with the screen.

The circuit can be configured to generate a series of perspective 3-D calibrated natural size views across multiple sequential time points of associated 3-D data sets using a common ROI to define respective reference planes in the 3-D data sets.

Embodiments of the invention are particularly suitable for implementation with image display systems allowing for touch gesture selection of a natural size view of a ROI using a tabletop, touch-controlled display. However, embodiments of the invention can be applicable for any use, with or without a touch-controlled display. Thus, the GUIs are not limited to medical work or uses. The GUIs can be used for single-user access, tabletop displays, portable displays, laptop and desktop displays, vertical displays, or displays that can be mounted in different orientations (substantially vertical or substantially horizontal).

Embodiments of the present invention are particularly suitable for medical image touch-input/screens or displays that allow navigation of visualizations of volumetric data, such as medical image data sets acquired by an imaging modality, for example, a Computed Tomography or MRI scanner.

However, other embodiments are directed to non-medical uses. For example, industries or technology areas that review visualizations of different (3-D or 4-D) image data sets including topographic maps of cities, lands, waters, air or outer space, security, biometrics or military uses and the like may find embodiments of the invention suitable for use.

It is noted that any one or more aspects or features described with respect to one embodiment may be incorporated in a different embodiment although not specifically described relative thereto. That is, all embodiments and/or features of any embodiment can be combined in any way and/or combination. Applicant reserves the right to change any originally filed claim or file any new claim accordingly, including the right to be able to amend any originally filed claim to depend from and/or incorporate any feature of any other claim although not originally claimed in that manner. These and other objects and/or aspects of the present invention are explained in detail in the specification set forth below.

DETAILED DESCRIPTION OF EMBODIMENTS OF THE INVENTION

Figure 1A:
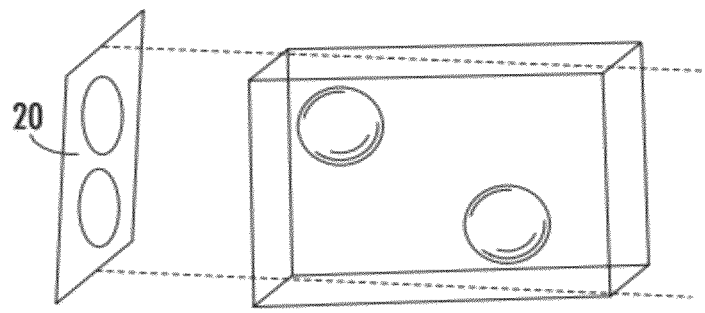
FIG. 1A is a schematic illustration of an orthographic projection of volumetric image data.
Figure 1B:
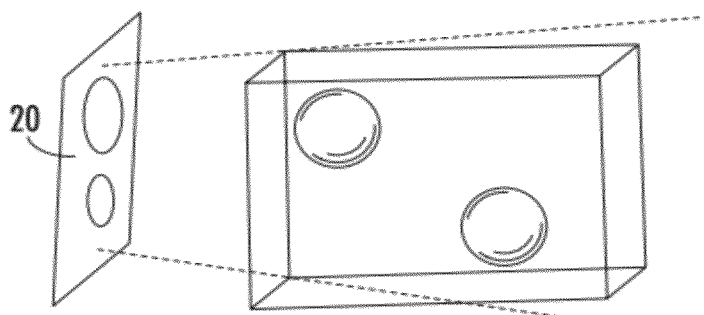
FIG. 1B is a schematic illustration of a 3-D perspective projection visualization model of volumetric image data.

The present invention will now be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. It will be appreciated that although discussed with respect to a certain embodiment, features or operation of one embodiment can apply to others.

In the drawings, the thickness of lines, layers, features, components and/or regions may be exaggerated for clarity and broken lines (such as those shown in circuit or flow diagrams) illustrate optional features or operations, unless specified otherwise. In addition, the sequence of operations (or steps) is not limited to the order presented in the claims unless specifically indicated otherwise.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items. Like numbers refer to like elements throughout. In the figures, the thickness of certain lines, layers, components, elements or features may be exaggerated for clarity.

As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

It will be understood that when a feature, such as a layer, region or substrate, is referred to as being "on" another feature or element, it can be directly on the other element or intervening elements may also be present. In contrast, when an element is referred to as being "directly on" another feature or element, there are no intervening elements present. It will also be understood that, when a feature or element is referred to as being "connected" or "coupled" to another feature or element, it can be directly connected to the other element or intervening elements may be present. In contrast, when a feature or element is referred to as being "directly connected" or "directly coupled" to another element, there are no intervening elements present. Although described or shown with respect to one embodiment, the features so described or shown can apply to other embodiments.

The term "circuit" refers to an entirely software embodiment or an embodiment combining software and hardware aspects, features and/or components (including, for example, at least one processor and software associated therewith embedded therein and/or executable by and/or one or more Application Specific Integrated Circuits (ASICs), for programmatically directing and/or performing certain described actions or method steps). The circuit can reside in one location or multiple locations, it may be integrated into one component or may be distributed, e.g., it may reside entirely in a workstation or single computer, partially in one workstation, cabinet, or computer, or totally in a remote location away from a local display at a workstation.

The term "visualization" means to present images to a user or users for viewing. The visualization can be in a flat 2-D image and/or in 2-D that appears to be 3-D images on a display, data representing features (physical, electrical or magnetic and the like) with different visual characteristics such as with differing intensity, opacity, color, texture and the like. The actual visualization can be shown on a screen or display so that the volume or region (e.g., map, or topographical or anatomical structure) is in a flat 2-D and/or in 2-D that appears to be 3-D volumetric images with data representing features or electrical output with different visual characteristics such as with differing intensity, opacity, color, texture and the like. The term "4-D" is a special case of 3-D, i.e., a 3-D data set with multiple (sequential) time steps. Thus, for example, a 4-D visualization can either illustrate a 3-D anatomic or land/topographic feature (e.g., heart/lung, street with traffic, or a river) with movement.

Embodiments may be particularly suitable for use with medical visualization of images from any imaging modality including MRI and CT. For MRI, the images may optionally be generated using DVR. DVR, a term well-known to those of skill in the art, comprises electronically rendering a medical image directly from data sets to thereby display visualizations of target regions of the body, which can include color as well as internal structures, using multi-dimensional 3D, 4D or more dimensional data. In contrast to conventional iso-surface graphic constructs, DVR does not require the use of intermediate graphic constructs (such as polygons or triangles) to represent objects, surfaces and/or boundaries. However, DVR can use mathematical models to classify certain structures and can use graphic constructs.

The term "automatically" means that the operation can be substantially, and typically entirely, carried out without human or manual input, and is typically programmatically directed or carried out. The term "electronically" includes both wireless and hard-wired connections between components.

The term "clinician" means physician, radiologist, physicist, coroner, medical examiner, forensic pathologist or other personnel desiring to review medical data of a patient, which is typically a live human or animal patient, but the subject may be deceased. The term "tissue" means blood, cells, bone and the like.

The term "calibrated natural size view" and derivatives thereof means that a 3-D perspective natural size view is shown calibrated to an ROI such that an object, feature or element is shown in an actual size on the display or screen such that it directly corresponds to the actual (physical) size as scanned or imaged and represented in the volumetric data. For example, a 1 cm size object in the volumetric data is shown as 1 cm on the screen at a defined reference plane, irrespective of the depth of the object in the scan volume, within a defined tolerance, such as +/− about 1% or less. The calibration is typically only valid for the thin reference plane. Other parts of the ROI at other depths will not necessarily have a calibrated size. The term "normal view" refers to a visualization that is rendered to show an image on a display without requiring object(s) and/or features therein to be shown in a true physical size.

A data set for the visualizations can be defined as a number of grid points in G dimensions, where there is V number of values in each grid point. The term "multi-dimensional" refers to both components, grid G and variates V, of the data sets. For data sets having a V≥1, the data set is referred to as multi-variate. As examples, a normal medical data set has G=3 and V=1, and a normal time-dependent volume has G=4 and V−1, a volume describing flow will have G=3 and V=3 (three values, since the velocity is a 3D vector). The data sets of the instant invention for medical images will typically have G and V values of G≤4 and V≤6. As known to those of skill in the art, traditional medical systems are bound by the 2D slice format used by the imaging modalities and use this base to construct higher-dimensional data.

Any document (patent, article and patent application) identified or referenced in this document (including the background or specification) is hereby incorporated by reference as if recited in full herein.

GUI controls, including GUI controls that allow touch input and touch gestures using a touch screen, are widely used and well known to those of skill in the art and will not be explained in further detail herein.

Figure 3:
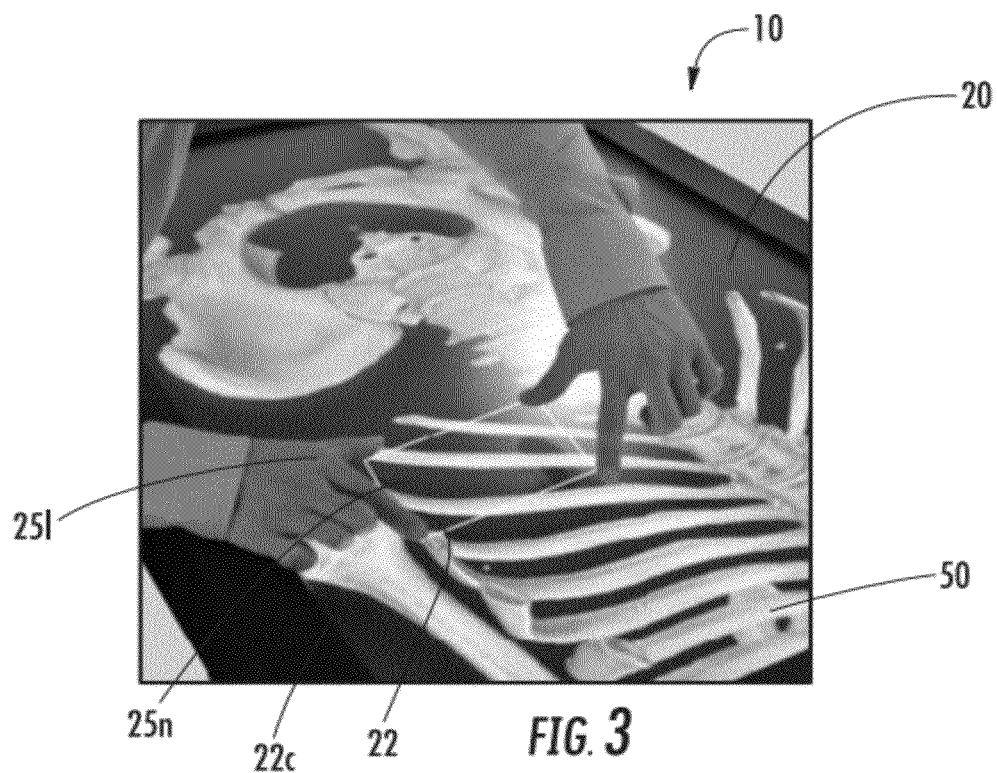
FIG. 3 is a top perspective image of a display with a calibrated natural size view mode using concurrent dual-touch input according to embodiments of the present invention.

Turning now to FIG. 3, a visualization system 10 with a display or screen 20 is illustrated. It is noted that the terms "display" and "screen" are used interchangeably. The display 20 can include a touch-input/touch-screen with a GUI 22. The natural size view can be activated using a touch gesture directly over or about an ROI (Region Of Interest) in a displayed image, using a stylet, mouse or other UI (User Interface) controls 22c or input. For example, a touch-movable icon can be placed over the ROI, which then activates the natural size view of that ROI. The icon may be sizable to allow a user to select the desired size of the ROI as well as location. The icon may reside in a toolbar or accept a "click to activate" it from a hidden view, type icon. The icon may be represented by an "eye" or "ruler" and the like to indicate natural size. However, other controls and/or inputs can be used to activate the natural size view mode or window. The normal image view may still be shown under and/or about the ROI view represented by the natural size view on the display.

Typically, the natural size view is shown on the display so that a reference point in the ROI normal view is kept the same in the ROI natural view to avoid an undue focus change or shift that may be disruptive to a user, as will be discussed further below.

The term "icon" refers to an object that represents a tool or action that can be accessed to select the natural size view for a ROI of a visualization on the display 20. The icons can include a defined physical shape with a graphic element or elements that represents actions that can be accessed via that object when activated. The graphic element or elements can comprise a pictogram, which may be in color.

Figure 4:
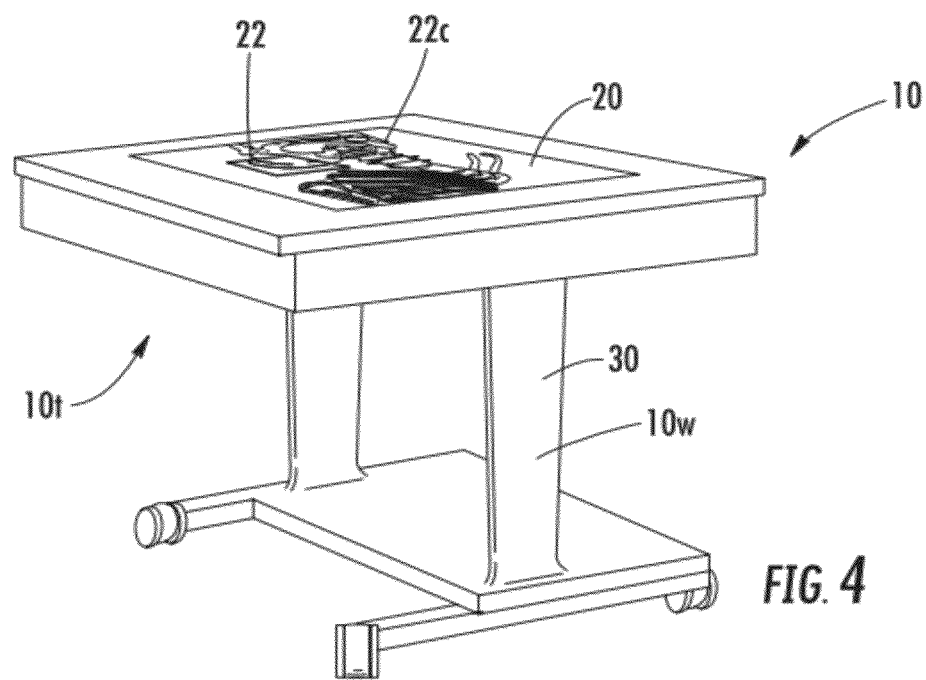
FIG. 4 is a side perspective view of a workstation with a display that can generate the calibrated natural size views according to particular embodiments of the present invention.

As shown in FIGS. 3 and 4, the display 20 is held on a workstation base 30 that orients the display 20 in a substantially horizontal orientation. The display 20 may be fixed in this orientation and/or may be configured to pivot up and down. This embodiment may be particularly suitable for pre-operative planning, collaborative medical uses or other collaborative uses.

The display 20 may also or alternatively be held on any type display including, for example, an electronic notebook, laptop computer, desktop computer or a workstation that holds the display 20 in any appropriate orientation, e.g., vertical or angled. The GUI controls 22c can be configured to operate irrespective of the type of display or orientation of the display. The system can allow different users to collaboratively view the visualization on different displays in different locations and when one user selects a natural size view of an ROI, this view may appear on the other displays.

In a regular monitor or display, the user can use a conventional UI, such as a mouse, to define a ROI and activate the natural view through standard selection operations, e.g., click and move operations.

In some embodiments, a user can use a touch gesture to activate a GUI control 22c that activates the natural size view 25n for a selected ROI within a normal visualization 50 on the display. The natural size view 25n can be selected by indicating via a UI a target ROI on a displayed visualization. The normal visualization of the selected ROI may be a zoomed-in or-out ROI and/or image. The natural size view of the ROI can be smaller or larger than the ROI in the normal view. The GUI controls 22c are useable over substantially the entire viewing area.

In some embodiments, the natural size visualization mode is "silent" and there are no GUI controls or options showing up on the screen; rather, the natural size view simply appears in the visualization in response to a defined basic interaction touch gesture. In some embodiments, as shown by the two hands on the screen 20 in FIG. 3, the GUI control 22c can be configured to accept one hand or, and more typically, concurrent (two hand) input with fingers in a defined orientation. For instance, a two-finger partial frame in a defined shape such as an "L", "U" or "C"-like shape on or about an ROI can be electronically associated with a touch gesture command that automatically generates the natural view of that ROI. However, other electronic touch gesture indications can be used to activate the natural size view of an ROI on the display 20.

The touch gesture control 22c shown in FIG. 3 represents corners of a rectangular frame, e.g., two fingers on each hand in a substantially "U"-like shape positioned about the ROI. Thus, in some embodiments, a particularly effective way of defining the ROI in the case of a touch-controlled table-top display is to allow a user to apply a touch gesture consisting of four fingers to represent the corners of a rectangle. The system 10 recognizes the gesture, which acts both as an activation of the natural size command and as the definition of the ROI. In case the four positions significantly deviate from a rectangular shape, the natural size command is not activated, which allows for other four-point gestures to be available simultaneously as the natural size command.

To indicate that the natural size view mode is active, the system 10 can display a defined visual delineation border 25l about the ROI in the natural size view, such as a rectangle or other perimeter line shape, to identify that the ROI is shown in a natural size view mode. The visual border 25l can be a closed line, open line, a broken line or other line shape or configuration. As shown in FIG. 3, with an indication that the natural size touch (command/activation) gesture has been recognized, the system can display a corresponding rectangular frame border 25*l* on the display 20.

Other active mode identifier schemes may also be used, such as an increased or darker intensity border about the ROI with the natural size view, and the like. Alternatively, or in addition to the visual border, in some embodiments, when a user selects (via a UI), a natural size view, the ROI shown in the natural size view may be presented with a different visual emphasis relative to the surrounding image, e.g., it can darken or otherwise visually increase in intensity and/or color to show that the natural view mode is active and/or the surrounding image can fade to be less visually dominant.

The natural size view mode may be affirmatively electronically activated or deactivated via a set-up or configuration input, task option (e.g., accessible via a toolbar or the like), or be integrated as an inherent operational system of the visualization system.

As discussed above, embodiments of the invention creates a calibrated "natural size" view such that 1 cm on the screen represents 1 cm of the object (typically a patient) scanned/represented in the volumetric data. Since, in a perspective projection visualization model, the size is differently depicted depending on the depth, in calibrated natural view the system is configured to define an appropriate depth position to use for the calibration.

In some embodiments, the system can display the reference point within the ROI that is used to define the reference plane. The system may alternatively be configured to visualize the derived reference plane in some other way.

As also noted above, embodiments of the invention are particularly suitable for medical imaging visualizations. In this field, natural size in 3D perspective views is often important since the images can be used as pre-operative planning tools and the usefulness of the planning depends on how realistic the visualization is. If the patient data visualized highly resembles what a surgeon will see in the operating room, this can lead to a high-quality preparation and in turn to improved patient care outcomes and time-savings in the operating room. As discussed above and shown in FIG. 3, one particularly pertinent embodiment is to apply the invention to a touch-controlled table-top display and the use of touch gestures to easily apply the viewing feature. For further discussion of direct-touch interactions, see, FI3D: Direct-Touch Interaction for the Exploration of 3D Scientific Visualization Spaces, Lingyun Yu, Pjotr Svetachov, Petra Isenberg, Maarten H. Everts, and Tobias Isenberg, IEEE TRANSACTIONS ON VISUALIZATION AND COMPUTER GRAPHICS, VOL. 16, NO. 6, NOVEMBER/DECEMBER 2010.

The visualization circuit or system 10 can identify the following two parameters to use in generating the calibrated natural size view: (1) information about the physical size of each voxel (volumetric image element) in the source images; and (2) information about the physical size of the monitor's display area. The voxel size is typically provided in meta-data accompanying the image data, for instance, according to the DICOM standard that is ubiquitous in medical imaging today. Other image data may use other standards or identified characterizing data. The physical size of the display area may be based on a default setting used by most systems, or the visualization systems may be customized, so that one version works for one specified display area size. The physical size of the display area may also be obtained in a set-up or configuration step, an automatic installation protocol, or otherwise prior to or during loading of the visualization software or circuit for a particular use or display. The system is configured to derive a depth position that is relevant for the visualization user to use as base for the natural size calibration.

Referring to FIG. 3, in some embodiments, the system 10 is configured to allow a user to select an ROI on the display 20, then the system 10 automatically (electronically/programmatically) analyzes the content of this ROI along the full depth in a virtual projection model. In this analysis, a depth map 115 (FIG. 9) can be collected using a data volume 100 which can include the entire volumetric data set of points in the data set that are visible (mapped to a non-transparent color) within the ROI (shown as the dark masses of different objects).

From this depth map 115, a reference point 101 is derived (e.g., mathematically calculated). A reference plane 102 is defined as being parallel to the screen plane 20*p* and including the reference point 101 in the ROI. The view of the ROI on the display 20 is then zoomed in or out such that the reference plane 102 is depicted in natural size on the display 20. The size of the virtual plane in patient coordinates is established using the known size of each voxel.

Figure 2:
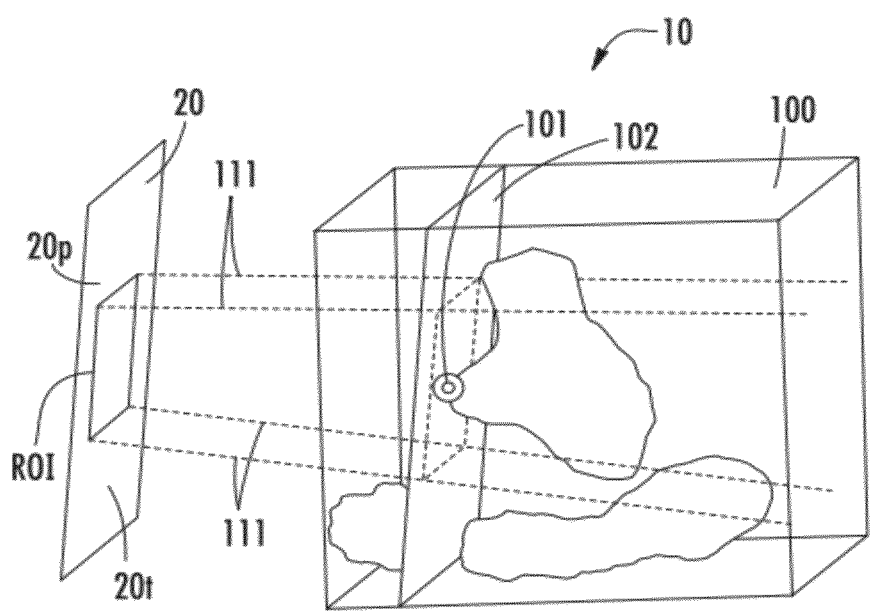
FIG. 2 is a schematic illustration of a visualization system with a selectable ROI that can be shown in a calibrated natural view according to embodiments of the present invention.

FIG. 2 illustrates an example of one possible derivation of the reference plane 102 for which the natural size calibration is performed. The user selects the region of interest (ROI) in the screen space (left). The volumetric data is analyzed for the ROI at all depths and the closest visible data point 101 is selected. The screen-parallel plane including the reference point is defined as the sought reference plane 102.

Which data points that are visible in the data volume 100 can be determined through a mapping algorithm, which in volume rendering is known as a Transfer Function. Note that changing the visual mapping, for instance a Transfer Function, could cause a different reference plane to be selected, even though nothing else has changed.

Figure 9:
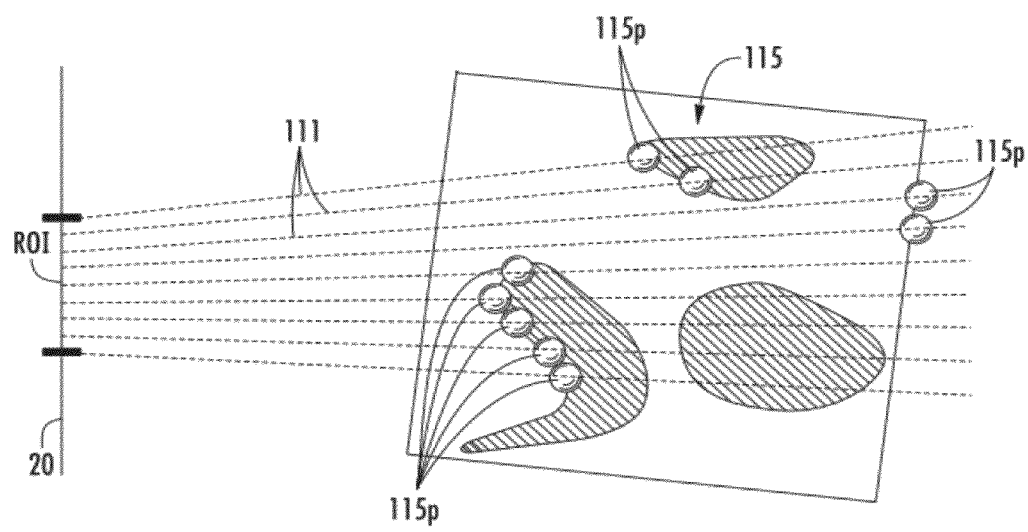
FIG. 9 is a schematic illustration of a depth map generated using virtual rays according to embodiments of the present invention.

By way of example only, one possible analysis method/procedure to find the reference point 101 is described below. A number of virtual rays 111 is cast according to the perspective projection model from the ROI into the volume, i.e., sampling data points of the volume. So as to not unduly visually clutter the example, only four rays 111 (at the corners of the ROI) are shown in FIG. 2. However, the rays 111 are typically distributed to project out over substantially the entire area of the ROI. FIG. 9 (in a simplified 2-D drawing for ease of discussion) illustrates that the virtual rays 111 are projected into the data volume to generate a depth map 115 of depth map points 115*p*. For each ray 111, the depth position is registered as the first point 115*p* where a visible point is encountered. Among the registered hit points, the one closest to the screen plane (shortest ray distance) can be selected as reference point. In some embodiments, between about 10-20,000 rays (and even more) may be used, but typically about 100 rays are sufficient to generate a good calibration result.

There are alternatives to the above procedure. The reference point 101, instead of being the registered visible point closest to the screen 20, may instead be derived as the average depth of visible pixels or another combined measure from the data volume 100. Instead of casting rays 111, the data volume 100 and/or depth map may be derived from the so called "z-buffer" that stores depth information in the regular volume rendering procedure.

For 4-D visualizations (perspective 3-D natural size views across multiple sequential time points), the reference planes 102 used for the series of calibrated natural size views can be based on reference points from the same ROI across multiple time steps.

In some embodiments, the system 10 is configured to allow interactive 3D visualizations, and navigation between different views can be configured to appear smooth to the user.

Figure 10A:
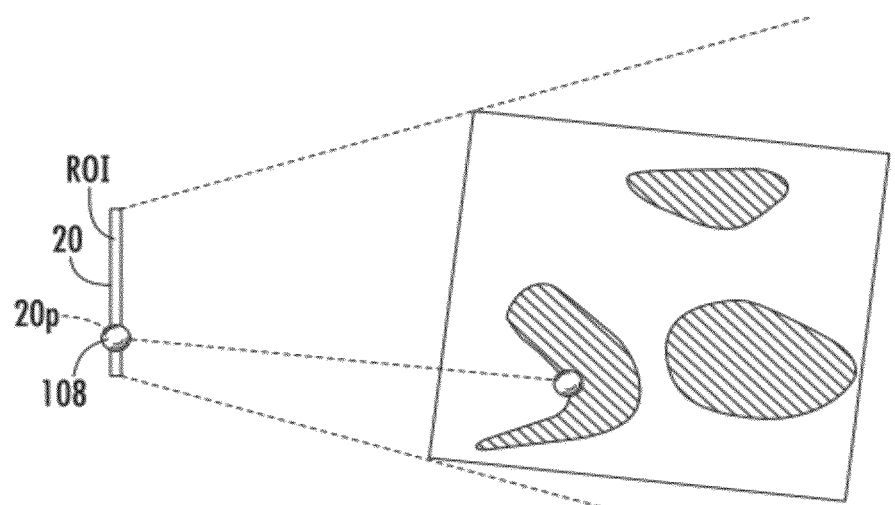
FIGS. 10A and 10B are schematic illustrations of an automated reference point adjustment between normal and natural size views according to embodiments of the present invention.
Figure 10B:
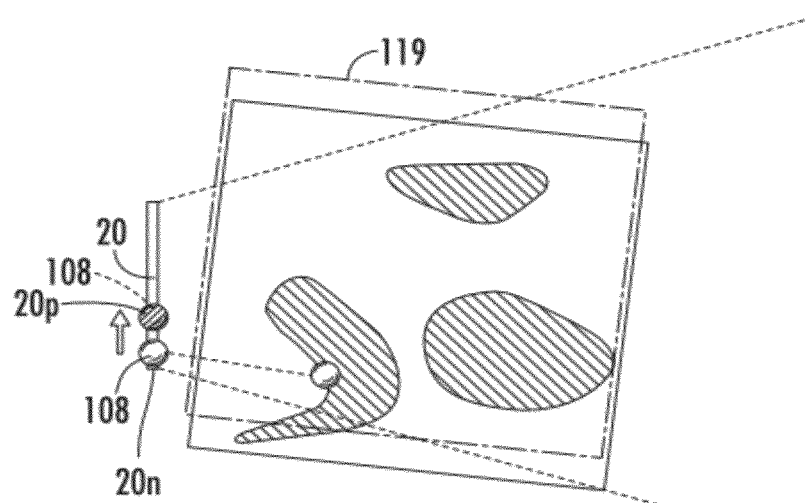

Therefore, it is typically preferred to applying the zooming to arrive at a natural size display or view from a normal view by a smooth animation between the two states. It is noted that when generating the natural size view, another effect that could be disturbing for the user is that the part of the data currently in focus can change position on the screen. With a straightforward zoom operation centered in the middle of the screen, the reference point would typically move on the screen. In the extreme case with an ROI far away from the screen center and a substantial zoom-in, the reference point may even move outside of the screen (not included in the currently shown viewport). Therefore, embodiments of the invention configure the system 10 so that the reference point 108 stays at substantially the same screen position 20$p$ as before the natural size view command. This reference point positional "anchoring" can be achieved by automatically identified panning operations. FIGS. 10A and 10B (simplified for discussion to a schematic 2-D drawing) illustrate this feature. FIG. 10A illustrates a normal view (before zoom) with an ROI selected and a reference point 108 in a position 20$p$ on the screen 20. FIG. 10B illustrates that (after zoom), the reference point 108, if unadjusted would be at a different location 20$n$, but the circuit/system can be configured to automatically adjust the position of the reference point 108 so that it is at the same position 20$p$ in the natural size view (FIG. 10B) as in the normal view (FIG. 10A). FIG. 10B shows the new position 20$n$ of the reference point 108 on screen 20, and that a pan operation (shown by an arrow) can be used to bring it back to the original point 20$p$ and the corresponding effect of the pan operation on the volume 119 (represented by the dash-dotted rectangle). In this example, the dashed lines do not correspond to the ROI, but the limits of the entire screen image.

Figure 5:
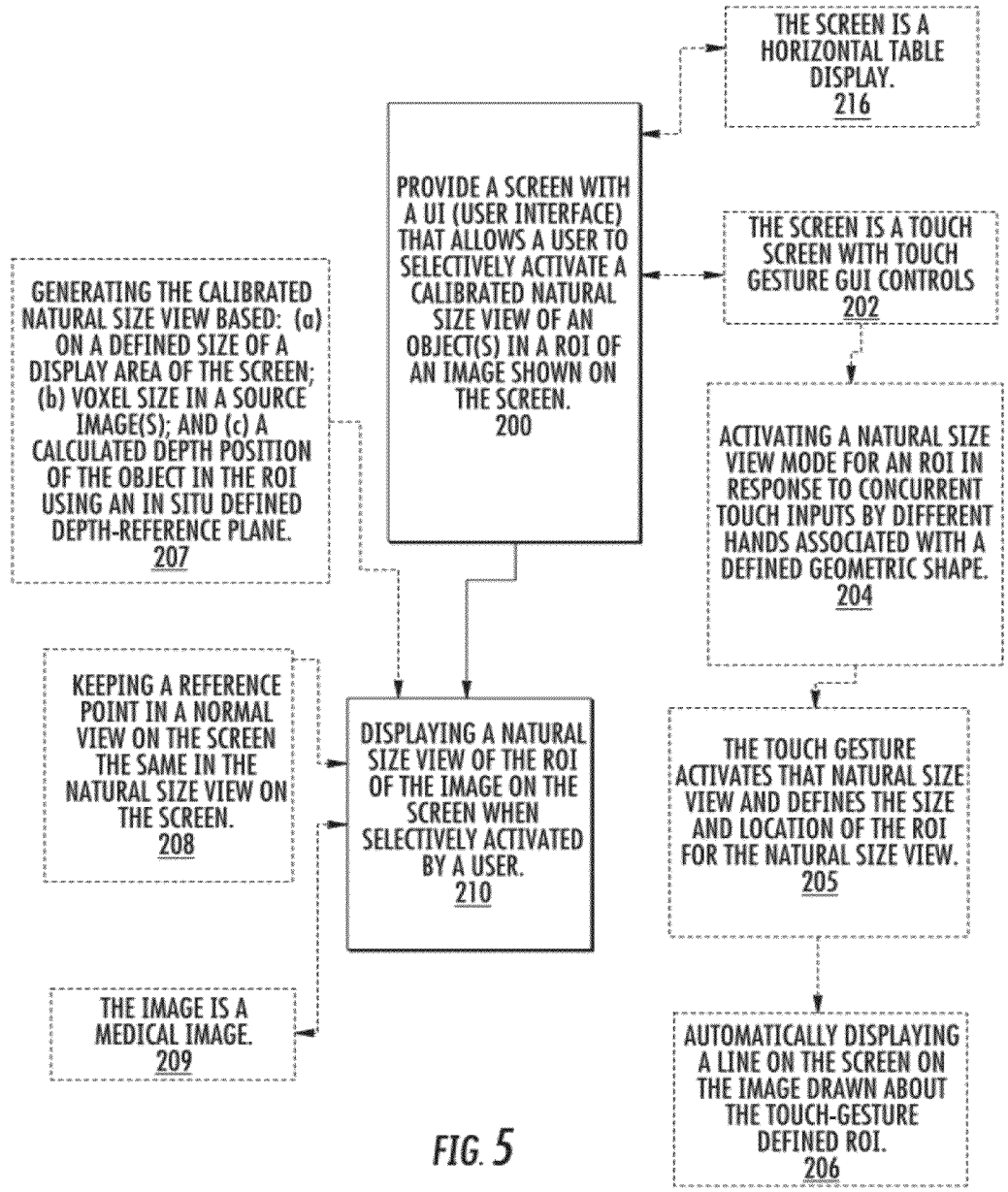
FIG. 5 is a flow chart/block diagram of exemplary operations and/or features that can be used to carry out embodiments of the present invention.

FIG. 5 illustrates exemplary steps or operations that can be carried out according to embodiments of the present invention. A screen with a UI (user interface) is provided that allows a user to selectively activate a calibrated natural size view of an object(s) in a ROI of an image shown on the screen (block 200). A natural size (calibrated) view image is shown on the screen when selectively activated by a user (block 210). That is, based on the selected ROI for the natural size view, the entire view can be changed, e.g., the reference plane of the ROI is in natural size.

Optionally, the screen is a touch screen with Touch Gesture GUI controls (block 202). The Natural Size View Mode can be activated for an ROI in response to concurrent touch inputs by different hands associated with a defined geometric shape (block 204). The touch gesture can activate that natural size view and define the size and location of the ROI for the natural size view (block 205). A line on the screen image can be automatically displayed about the touch-gesture defined ROI (block 206). The calibrated natural size view can be generated based on: (a) a defined size of a display area of the screen; (b) voxel size data in a source image(s); and (c) a calculated depth position of the object in the ROI using an in situ defined depth-reference plane (block 207).

A reference point in a normal view on the screen can be the same in the natural size view on the screen (block 208). The image can be a medical image (block 209).

Figure 8A:
FIGS. 8A-8C are exemplary visualizations showing a sequence of events, including a normal view image (FIG. 8A), a selected ROI on the normal view image (FIG. 8B), and a natural size visualization of the selected ROI (FIG. 8C), according to embodiments of the present invention.
Figure 8B:
Figure 8C:

FIGS. 8A-8C are exemplary visualizations showing a typical sequence of events. The system 10 generates a normal view (of the visualized image) on a display as shown in FIG. 8A. A user selects a target ROI on the normal view image for a natural size view (FIG. 8B). The system then generates the natural size view of the selected ROI (FIG. 8C). In this example, the image is "zoomed" so that the selected ROI is shown in natural size on the display.

As discussed above, embodiments of the present invention may take the form of an entirely software embodiment or an embodiment combining software and hardware aspects, all generally referred to herein as a "circuit" or "module." Furthermore, the present invention may take the form of a computer program product on a computer-usable storage medium having computer-usable program code embodied in the medium. Any suitable computer readable medium may be utilized including hard disks, CD-ROMs, optical storage devices, a transmission media such as those supporting the Internet or an intranet, or magnetic storage devices. Some circuits, modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed digital signal processor or microcontroller. Embodiments of the present invention are not limited to a particular programming language.

Computer program code for carrying out operations of data processing systems, method steps or actions, modules or circuits (or portions thereof) discussed herein may be written in a high-level programming language, such as Python, Java, AJAX (Asynchronous JavaScript), C, and/or C++, for development convenience. In addition, computer program code for carrying out operations of exemplary embodiments may also be written in other programming languages, such as, but not limited to, interpreted languages. Some modules or routines may be written in assembly language or even micro-code to enhance performance and/or memory usage. However, embodiments are not limited to a particular programming language. As noted above, the functionality of any or all of the program modules may also be implemented using discrete hardware components, one or more application specific integrated circuits (ASICs), or a programmed digital signal processor or microcontroller. The program code may execute entirely on one (e.g., a workstation computer), partly on one computer, as a stand-alone software package, partly on the workstation's computer or Scanner's computer and partly on another computer, local and/or remote or entirely on the other local or remote computer. In the latter scenario, the other local or remote computer may be connected to the user's computer through a local area network (LAN) or a wide area network (WAN), or the connection may be made to an external computer (for example, through the Internet using an Internet Service Provider).

The present invention is described in part with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing some or all of the functions/acts specified in the flowchart and/or block diagram block or blocks.

The flowcharts and block diagrams of certain of the figures herein illustrate exemplary architecture, functionality, and operation of possible implementations of embodiments of the present invention. In this regard, each block in the flow charts or block diagrams represents a module, segment, or portion of code, which comprises one or more executable instructions for implementing the specified logical function(s). It should also be noted that in some alternative implementations, the functions noted in the blocks may occur out of the order noted in the figures. For example, two blocks shown in succession may in fact be executed substantially concurrently or the blocks may sometimes be executed in the reverse order or two or more blocks may be combined, depending upon the functionality involved.

Figure 6:
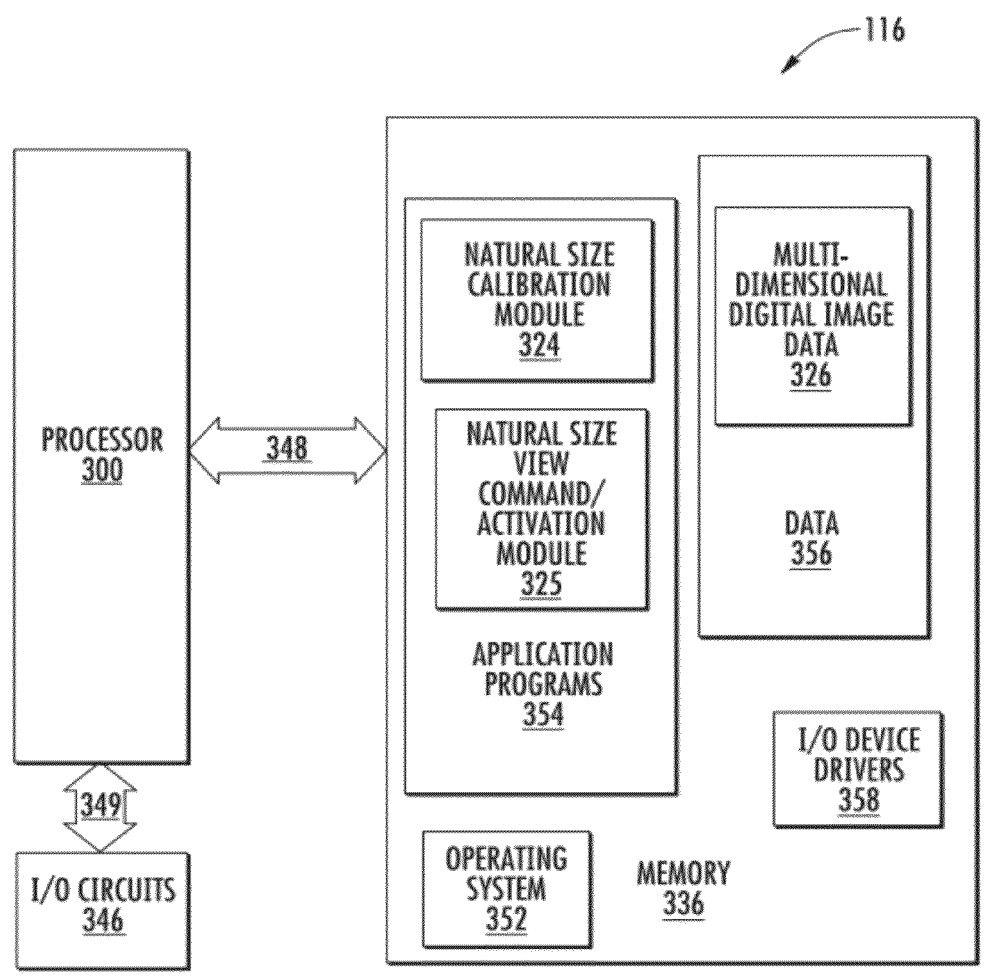
FIG. 6 is a schematic illustration of a data processing circuit or system according to embodiments of the present invention.

As illustrated in FIG. 6, embodiments of the invention may be configured as a data processing system 116, which can be used to carry out or direct operations of the rendering, and can include a processor circuit 300, a memory 336 and input/output circuits 346. The data processing system may be incorporated in, for example, one or more of a personal computer, workstation (30, FIG. 4, 10*w*, FIG. 7), server, router or the like. The system 116 can reside on one machine or be distributed over a plurality of machines. The processor 300 communicates with the memory 336 via an address/data bus 348 and communicates with the input/output circuits 346 via an address/data bus 349. The input/output circuits 346 can be used to transfer information between the memory (memory and/or storage media) 336 and another computer system or a network using, for example, an Internet protocol (IP) connection. These components may be conventional components such as those used in many conventional data processing systems, which may be configured to operate as described herein.

In particular, the processor 300 can be commercially available or custom microprocessor, microcontroller, digital signal processor or the like. The memory 336 may include any memory devices and/or storage media containing the software and data used to implement the functionality circuits or modules used in accordance with embodiments of the present invention. The memory 336 can include, but is not limited to, the following types of devices: ROM, PROM, EPROM, EEPROM, flash memory, SRAM, DRAM and magnetic disk. In some embodiments of the present invention, the memory 336 may be a content addressable memory (CAM).

As further illustrated in FIG. 6, the memory (and/or storage media) 336 may include several categories of software and data used in the data processing system: an operating system 352; application programs 354; input/output device drivers 358; and data 356. As will be appreciated by those of skill in the art, the operating system 352 may be any operating system suitable for use with a data processing system, such as IBM®, OS/2®, AIX® or zOS® operating systems or Microsoft® Windows®95, Windows98, Windows2000 or WindowsXP operating systems Unix or Linux™. IBM, OS/2, AIX and zOS are trademarks of International Business Machines Corporation in the United States, other countries, or both while Linux is a trademark of Linus Torvalds in the United States, other countries, or both. Microsoft and Windows are trademarks of Microsoft Corporation in the United States, other countries, or both. The input/output device drivers 358 typically include software routines accessed through the operating system 352 by the application programs 354 to communicate with devices such as the input/output circuits 346 and certain memory 336 components. The application programs 354 are illustrative of the programs that implement the various features of the circuits and modules according to some embodiments of the present invention. Finally, the data 356 represents the static and dynamic data used by the application programs 354 the operating system 352 the input/output device drivers 358 and other software programs that may reside in the memory 336.

The data 356 may include (archived or stored) digital image data sets 326 that provides stacks of image data including meta data regarding, for example, voxel size (and if medical images can be correlated to respective patients). As further illustrated in FIG. 6, according to some embodiments of the present invention application programs 354 include a Natural Size Calibration Module 324 and a Natural Size View Command/Activation Module 325. The application program 354 may be located in a local server (or processor) and/or database or a remote server (or processor) and/or database, or combinations of local and remote databases and/or servers.

While the present invention is illustrated with reference to the application programs 354, and Modules 324, 325 in FIG. 6, as will be appreciated by those of skill in the art, other configurations fall within the scope of the present invention. For example, rather than being application programs 354 these circuits and modules may also be incorporated into the operating system 352 or other such logical division of the data processing system. Furthermore, while the application programs 324, 325 are illustrated in a single data processing system, as will be appreciated by those of skill in the art, such functionality may be distributed across one or more data processing systems in, for example, the type of client/server arrangement described above. Thus, the present invention should not be construed as limited to the configurations illustrated in FIG. 6 but may be provided by other arrangements and/or divisions of functions between data processing systems. For example, although FIG. 6 is illustrated as having various circuits and modules, one or more of these circuits or modules may be combined or separated without departing from the scope of the present invention.

Figure 7:
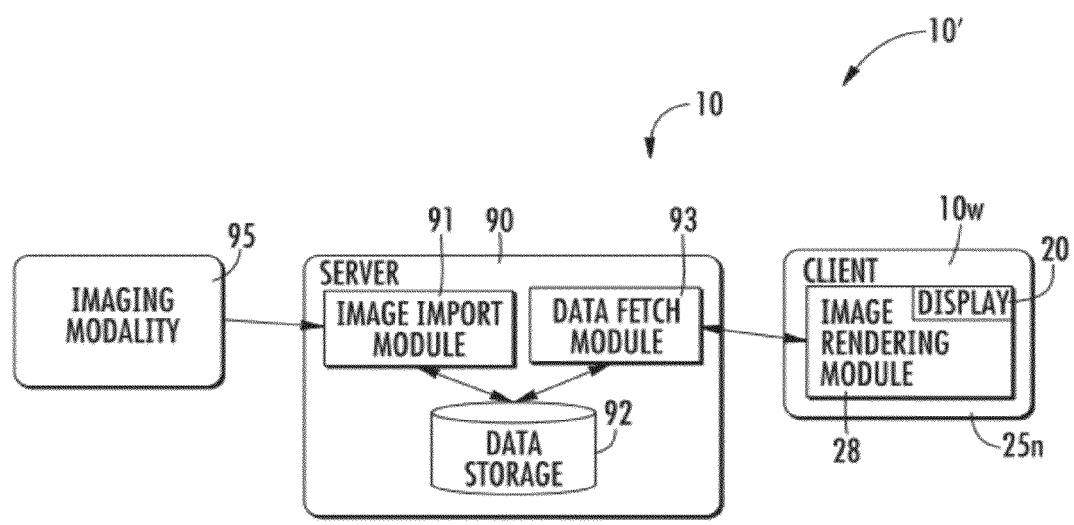
FIG. 7 is a schematic illustration of a PACs system with a calibrated natural size view mode according to embodiments of the present invention.

FIG. 7 illustrates that, in particular embodiments, the system 10 can include or be in communication with a PACS (picture archiving and communication system). The system 10 can include, for example, at least one server 90 with an image import module 93, data storage 92, a data fetch module 93, a client (e.g., workstation) 10*w* and a rendering system 28. The system 10 can optionally be in communication with at least one imaging modality 95 that electronically obtains respective volume data sets (which for medical uses is patient data sets) and can electronically transfer the data sets to the electronic storage 92.

In some particular embodiments, the imaging modality 95 can be any desirable modality such as, but not limited to, NMR, MRI, X-ray of any type, including, for example, CT (computed tomography) and fluoroscopy, ultrasound, and the like. The visualization system 10 may also operate to render images using data sets from more than one of these modalities. That is, the visualization system 10 may be configured to render images irrespective of the imaging modality data type (i.e., a common system may render images for both CT and MRI volume image data). In some embodiments, the system 10 may optionally combine image data sets generated from different imaging modalities 95 to generate a combination image for a patient.

In particular embodiments, as shown in FIGS. 3 and 4, the system 10 comprises a table 10t that is sized to allow a user to experience a presentation substantially equivalent to "a patient on a table". Thus, the table 10t can hold a relatively large screen 20, such as a screen having a size that is between about 30-100 inches (measured on the diagonal), typically between about 40-80 inches, and more typically about 46 inches. The resolution may be any suitable resolution for the intended purpose, but is typically at about 1920×1080p resolution. As shown in FIG. 4, the table 10t can allow horizontal display. However, the table 10t may also allow for vertical display (and/or screen storage) to provide more versatility in terms of usage scenarios since it would be visible from a larger distance and/or be less space consuming.

Perspective projection with a fixed angle can be used in some embodiments. On demand, the user can launch a set of browsable Multiplanar Reconstruction (MPR) views showing the three main orientations.

In particular embodiments, the system 10 can operate using volume rendering software that may be on-board the table 10t or may reside totally or partially in a remote component (e.g., server, computer or the like). The volume rendering module can include GPU-based raycasting that includes Direct3D version 10 and high-end off-the-shelf graphic boards. Of course, custom modules and hardware may optionally be used. Data can optionally be processed in texture blocks, sized $512^3$ at maximum. Textures can overlap by one voxel to facilate hardware-accelerated trilinear interpolation. As known to those of skill in the art, acceleration based on empty-space skipping may optionally be employed, based on block geometries. See, e.g., H. Scharsach, Advanced GPU Raycasting, In Central European Seminar on Computer Graphics, pp. 69-76 (2005), the contents of which are hereby incorporated by reference as if recited in full herein.

In some embodiments, the system 10 can have a default configuration where the rendering engine maintains a fixed high frame rate (25 fps) and reduces the rendering quality if necessary. Quality reduction is achieved by increasing the sample step size along the ray, whereas the ray density can always be one ray per screen pixel. At full quality, the rate can be 2.5 samples per voxel and a typical interaction quality corresponds to 1.33 samples per voxel. In a representative scenario, a data set of 512×512×1895 voxels can be rendered in a 1920×1080 viewport with 1.33 samples per voxel on an nVidia GeForce GTX580. Using the typical transfer function, the system 10 can achieve a frame rate of 23 fps.

The system can include a basic set of touch gestures that can be used to provide 6 DOF, including x-y pan, x-y-z rotation and zoom, through a combination of one- and two-finger interactions in a 2 DOF touch input to the screen. For example, a touch gesture for rotation about x and y axis with a single finger, rotation about the z-axis with two fingers, panning in the x-y plane with two fingers, and zooming with a two finger pinch. In some embodiments, the rotation around x- and y-axes is connected to a single-touch movement and is relative to a global reference point. The reference point can be default set to the middle of the volume. The user can also explicitly define the (global) reference point through a double touch, which selects the closest visible point of the volume corresponding to the screen position. A fixed mapping of input movement to amount of rotation can be used, typically set at 0.2 degrees per screen pixel.

Other DOFs can include rotate-scale-translate (RST) interactions achieved by two-touch pinching, which for 2D is well known in many touch applications. Rotation around the z-axis is connected to the angular movement of the directed line between the two touch points. The rotation axis can be set at the midpoint between the touch points, referred to as the "touch midpoint". Panning in the x-y-plane can be determined by the xy movement of the touch midpoint. Where a perspective model is used for the visualization, it may be appropriate and/or even necessary to identify a depth for which the panning movement is equal to the input movement. This can be defined as the closest visible point at the z-axis of the touch midpoint. Finally, the distance between the touch points determines the zoom factor, changing the distance corresponds to changing the zoom with the same factor. The three "two-point" gestures can be available simultaneously, which can provide a sense of direct and complete control and a typical actual two-point gesture can invoke all three interactions to some extent.

In some particular embodiments the user can define which part of the data that the natural size calibration should be performed on. To apply natural size magnification, the user selects a region of interest 25n (for natural size viewing) (ROI) as shown in FIG. 3. As described above, the touch gesture used to command this natural size view can be carried out using four fingers representing the corners of a rectangle. The gesture thus acts both as an activation of the natural size command and as the definition of the ROI. In case the four positions significantly deviate from a rectangular shape (e.g., two closely spaced substantially "L" shaped finger touch gesture), the natural size command is not activated, which allows for other four-point gestures to be available simultaneously. As an indication that the natural size gesture has been recognized, the system 10 can display a corresponding (e.g., substantially rectangular or other polygonal) frame 22 on the display.

The system 10 then analyzes the content of selected ROI along the full depth in the virtual projection model. As described above, a depth map 115 (FIG. 9) of visible (having non-transparent TF mapping) points 115p is collected. From this depth map 115, a reference point 101 (FIG. 2) is derived. The plane 102 that is parallel to the screen plane 20p and includes the reference point 101 is typically the one to be shown in natural size on the screen. The calibration uses data of known physical sizes of voxels and the display. The magnification includes both a zoom and a pan operation, through which the screen position of the reference point remains fixed to allow undisturbed focus of attention for the user. There are many possible solutions for deriving the reference point from the depth map 115 other than that described above. The derivation of the depth map can also be done in different ways. As also discussed above, a plurality of virtual rays 111 are cast substantially evenly spread in the ROI, typically between about 50-200, and more typically about 100, but other numbers may be used and the rays may be asymetrically positioned with respect to each other in the ROI. The implementation could easily be made more precise but it is contemplated that it would make little difference for the user experience.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this That which is claimed:

1. A visualization system, comprising:
a display;
a user interface (UI) associated with the display; and
a circuit in communication with the display and the UI configured to: (1) show an image generated as a perspective 3-D rendering of voxels of an image data set comprising volumetric data on the display in a normal view; (2) allow a user to select a target region of interest (ROI) in the normal view of the perspective 3-D rendered image on the display using the UI; and (3) in response to the user selected target ROI, present an entire new view as a perspective 3-D natural size image view calibrated with respect to the selected target ROI on the display such that extent of the perspective 3-D natural size calibrated image view differs from extent of the 3-D perspective image in the normal view on the display and such that an object, feature or element in the selected target ROI is shown in an actual physical size on the display such that it directly corresponds to the actual physical size as scanned or imaged and represented in the volumetric data,
wherein the circuit is configured to derive at least one reference point in a perspective 3-D projection of the ROI in the volumetric data based on identification of depth locations of features in a mapping volume to generate the calibrated 3-D perspective natural size view.

2. The system of claim 1, wherein the circuit is configured to define a reference plane parallel to a viewing screen plane associated with the ROI on the display, and wherein the reference plane is used to generate the perspective 3-D calibrated natural size view.

3. The system of claim 1, wherein the at least one reference point is defined by an object in the mapping volume closest to the screen plane.

4. The system of claim 1, wherein the display is a touch screen display, wherein the UI comprises a graphic user interface controls that recognizes defined touch gestures, and wherein a defined substantially rectangular shape touch gesture associated with a concurrent two-hand, four finger touch shape on the display both (i) commands the circuit to generate the perspective 3-D natural size view calibrated to the selected target ROI and (ii) defines a boundary for the selected target ROI.

5. The system of claim 1, wherein the display is a touch screen display, wherein the circuit is configured to provide graphic user interface controls which recognizes defined touch gestures on the display as the UI that commands the circuit to generate the calibrated natural size view, and wherein a defined touch gesture on the display in the normal view is made by the user proximate the target ROI to select the target ROI and define a size and location of the selected target ROI and which activates the circuit to generate the perspective 3-D calibrated natural size view of the target ROI.

6. The system of claim 1, wherein, when an ROI is selected for a perspective 3-D calibrated natural size view on the display, a visual border is shown on the display about the ROI in the normal view.

7. The system of claim 1, wherein the circuit is configured to analyze meta-data associated with the voxels of the image data set to define a physical size of voxels, and wherein the circuit is configured to calculate physical size for the 3-D calibrated natural size view based on the physical voxel size and a known display area size associated with the display.

8. The system of claim 1, wherein the circuit is configured to define a reference point in the normal view with the selected target ROI and generate the calibrated natural size view so that it maintains the reference point in the same location on the image on the display between the normal and calibrated natural size views.

9. The system of claim 1, wherein the circuit is configured to generate a series of reference planes parallel to the display having the at least one reference point in the target ROI to zoom or pan to, to provide the selected natural size view on the display using a common ROI based on the selected target ROI across multiple time points of related 3-D data sets to generate multiple time points of perspective 3-D calibrated natural size views.

10. The system of claim 1, wherein the 3-D image data set is a medical image data set.

11. The system of claim 10, wherein the perspective 3-D rendering of the 3-D image data set is generated using direct volume rendering, and wherein the circuit is configured to generate a change between the normal view to the calibrated view in smooth animation between the views.

12. The system of claim 1, wherein the display is provided on a workstation table.

13. A visualization system comprising:
a touch screen;
a graphic user interface (GUI) circuit in communication with the screen, the GUI circuit configured with GUI touch gesture controls;
a visualization circuit in communication with the screen and the GUI circuit, wherein the visualization circuit is configured to allow a user to select a target region of interest (ROI) on a perspective 3-D image rendered from voxels of an image data set comprising volumetric data shown on the screen in a normal view using a defined, two-hand, multi-finger touch gesture, wherein the GUI touch gesture controls are useable over substantially all the 3-D perspective image in normal view to allow user selection of various potential target ROIs, and wherein, in response to a user selected target ROI, the visualization circuit is configured to then generate a natural size view as an entire new calibrated view, calibrated to the user selected target ROI such that an object, feature or element in the selected target ROI is shown in an actual physical size on the touch screen such that it directly corresponds to the actual physical size as scanned or imaged and represented in the volumetric data based on: (i) an in situ generated 3-D perspective projection mapping volume used to electronically define a reference plane in a depth dimension; (ii) meta-data defining voxel size of associated with the image data set; and (iii) a display area size associated with the screen.

14. The system of claim 13, wherein the mapping volume is generated using a plurality of virtual rays projected into the mapping volume from across substantially an entire area of the ROI to generate depth map points of the mapping volume, wherein for each ray, a depth position is registered as a first point where a visible point is encountered.

15. A method of interacting with image data; comprising:
providing an interactive screen with a GUI (graphic user interface);
providing a normal view on the screen of a perspective 3-D image rendered from voxels of volumetric image data;
allowing a user to select a region of interest (ROI) on or in the image shown on the screen in the normal view using the GUI such that the selected ROI can be in any location over substantially the entire normal view; and electronically displaying on the screen an entire new view as a perspective 3-D natural size view calibrated to the ROI on the screen in response to the step of allowing a user to select the ROI such that an object, feature or element in the selected target ROI is shown in an actual physical size such that it directly corresponds to the actual physical size as scanned or imaged and represented in the volumetric image data, wherein displaying is carried out by electronically deriving at least one reference point in a perspective 3-D projection of the ROI in the volumetric image data based on identification of depth locations of features in a mapping volume to generate the calibrated 3-D perspective natural size view.

16. The method of claim 15, wherein the screen is a touch screen, and wherein the allowing a user to select the ROI step is carried out by accepting a defined touch gesture.

17. The method of claim 16, wherein the defined touch gesture is a concurrent two hand, multiple-finger touch gesture forming a substantially rectangular shape about the ROI on the screen, whereby the touch gesture activates the natural size view calibrated to the ROI and defines the size and location of the ROI.

18. The method of claim 15, further comprising automatically displaying a line on the screen image about the selected ROI for the natural size view, wherein the line is a perimeter line that connects points associated with four points defined by two fingers on each of two hands, with the fingers on each hand held in a substantially "L" shape.

19. The method of claim 15, further comprising electronically calculating a calibrated natural size of an object in the ROI based on: (a) a defined size of a display area of the screen; (b) voxel size associated with source image(s) of the data set; and (c) a calculated depth position of the object in the ROI using an in situ defined depth-reference plane using the mapping volume.

20. The method of claim 15, wherein the displaying step is carried out so that a reference point in a normal view on the screen used to select the ROI of the natural size view is at the same location in the natural size view on the screen.

21. The method of claim 15, wherein the volumetric image data is associated with a patient medical data set.

22. The method of claim 15, wherein the step of electronically displaying the perspective 3-D calibrated natural size view is carried out by displaying a series of multiple time points of perspective 3-D calibrated natural size views using the same ROI to derive reference planes in the associated 3-D data sets, wherein the reference planes are parallel to the display in the target ROI to zoom or pan to, to thereby provide the calibrated natural size view.

23. A computer program product for visualization systems of image data sets, the computer program product comprising:

a non-transitory computer readable storage medium having computer readable program code embodied in the medium, the computer-readable program code comprising:

computer readable program code configured to allow a user to select a target region of interest (ROI) in a normal view of a 3-D perspective image of a volumetric image data set on a display; and computer readable program code configured to generate an entire new view as a perspective 3-D natural size image view calibrated to the selected target ROI on the display in response to a user's selection such that extent of the perspective 3-D natural size calibrated image view differs from extent of the 3-D perspective image in the normal view on the display and such that an object, feature or element in the selected target ROI is shown in an actual physical size such that it directly corresponds to the actual physical size as scanned or imaged and represented in the volumetric image data set; and computer readable program code configured to derive at least one reference point in a perspective 3-D projection of the ROI in the volumetric image data set based on identification of depth locations of features in a mapping volume to generate the calibrated 3-D perspective natural size view.

24. The computer program product of claim 23, wherein the computer program code that generates the natural size view calculates size based on: (a) a defined size of a display area of the screen; (b) voxel size associated with source image (s) of the data set; and (c) a calculated depth position of the object in the ROI using an in situ defined depth-reference plane using the mapping volume.

25. The computer program product of claim 23, wherein the computer readable program code that is configured to allow a user to select the target ROI is configured to recognize a defined touch gesture having a concurrent two hand, multiple-finger touch gesture with four fingers forming a substantially rectangular shape about the ROI on the screen, whereby the touch gesture activates the natural size view calibrated to the ROI and defines the size and location of the ROI for generating the natural size view.

26. The computer program product of claim 23, further comprising computer readable program code that identifies a reference point in a normal view of the ROI on the screen and displays the calibrated natural size view so that the reference point is at the same location in the natural size view on the screen.

27. A visualization circuit for generating visualizations of image data sets, wherein the visualization circuit is configured to accept user input to select a target region of interest (ROI) for a natural size view in a 3-D perspective image shown in a normal view on a display screen, wherein the 3-D perspective image is rendered from a volumetric image data set, wherein the user input is carried out using a defined, two-hand, multi-finger touch gesture that can be placed at any location over the image in the normal view to select and size the target ROI, and wherein the visualization circuit is configured to generate the natural size view as an entire new view calibrated to the selected ROI such that an object, feature or element in the selected target ROI is shown in an actual physical size on the display screen such that it directly corresponds to the actual physical size as scanned or imaged and represented in the volumetric image data set based on: (i) an in situ generated 3-D perspective projection mapping volume used to electronically define a reference plane in a depth dimension; (ii) meta-data defining voxel size associated with the image data set; and (iii) a display area size associated with the screen.

28. The circuit of claim 27, wherein the circuit is configured to generate a series of perspective 3-D natural size views across multiple sequential time points of associated 3-D data sets using a common ROI to define respective reference planes in the 3-D data sets.

29. A medical image visualization system, comprising: a display; a user interface (UI) associated with the display; and a circuit in communication with the display and the UI configured to: (1) show a 3-D image rendered from voxels of an image data set comprising volumetric data on the display in a normal view; (2) allow a user to select a location and size of a target region of interest (ROI) in the normal view of the 3-D image on the display using the UI; and (3) in response to the user selected target ROI, present an entire new view as a 3-D perspective natural size view which is shown calibrated to an ROI such that an object, feature or element is shown in an actual physical size on the display such that it directly corresponds to the actual physical size as scanned or imaged and represented in the volumetric data.

30. The system of claim 29, wherein the circuit is configured to allow a user to select any location on the 3-D image in the normal view as the target ROI, wherein the circuit is configured to derive at least one reference point in a perspective 3-D projection of the ROI in the image data set of volumetric data based on identification of depth locations of features in a depth mapping volume to generate the calibrated 3-D perspective natural size view.

31. The system of claim 30, wherein the mapping volume is generated using a plurality of virtual rays projected into the mapping volume from across substantially an entire area of the ROI to generate depth map points of the mapping volume, wherein for each ray, a depth position is registered as a first point where a visible point is encountered.

32. The system of claim 31, wherein among the registered points, one closest to a screen plane associated with a shortest ray distance is selected as reference point.

33. The system of claim 31, wherein the number of virtual rays in the mapping volume is between about 10-20,000 rays.

34. The system of claim 31, wherein a reference point is selected from the mapping volume derived from an average depth of visible pixels from the mapping volume.

35. The system of claim 30, wherein the mapping volume is a depth map derived from a "z-buffer" that stores depth information in a regular volume rendering procedure.

36. The system of claim 29, wherein the circuit is configured to generate the new view of the calibrated natural size 3-D image using (i) an in situ generated 3-D perspective projection mapping volume to electronically define a reference plane in a depth dimension; (ii) meta-data defining voxel size of associated with the image data set; and (iii) a display area size associated with the display such that extent of the perspective 3-D natural size calibrated image view differs from extent of the 3-D perspective image in the normal view on the display.

37. The system of claim 29, wherein part of the 3-D image in the normal view is not shown in the 3-D natural size calibrated view.

* * * * *

UNITED STATES PATENT AND TRADEMARK OFFICE
CERTIFICATE OF CORRECTION

Page 1 of 1

PATENT NO.        : 9,053,574 B2
APPLICATION NO.   : 13/218877
DATED             : June 9, 2015
INVENTOR(S)       : Ernvik et al.

It is certified that error appears in the above-identified patent and that said Letters Patent is hereby corrected as shown below:

In the specification

Column 7, Line 25: Please correct "and V-1,"
to read -- and V=1, --

Signed and Sealed this
Twenty-third Day of February, 2016

Michelle K. Lee
*Director of the United States Patent and Trademark Office*